US012676381B2

(12) United States Patent
Ootsuka et al.

(10) Patent No.: US 12,676,381 B2
(45) Date of Patent: Jul. 7, 2026

(54) SEALED BATTERY

(71) Applicant: Panasonic Intellectual Property Management Co., Ltd., Osaka (JP)

(72) Inventors: Masao Ootsuka, Osaka (JP); Tadayoshi Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 926 days.

(21) Appl. No.: 17/783,562

(22) PCT Filed: Nov. 17, 2020

(86) PCT No.: PCT/JP2020/042744
§ 371 (c)(1),
(2) Date: Jun. 8, 2022

(87) PCT Pub. No.: WO2021/117426
PCT Pub. Date: Jun. 17, 2021

(65) Prior Publication Data
US 2023/0027470 A1 Jan. 26, 2023

(30) Foreign Application Priority Data
Dec. 13, 2019 (JP) ................................. 2019-225354

(51) Int. Cl.
*H01M 50/184* (2021.01)
*H01M 50/107* (2021.01)
*H01M 50/342* (2021.01)

(52) U.S. Cl.
CPC ..... *H01M 50/3425* (2021.01); *H01M 50/107* (2021.01); *H01M 50/184* (2021.01)

(58) Field of Classification Search
None
See application file for complete search history.

(56) References Cited

U.S. PATENT DOCUMENTS

| 4,803,136 A * | 2/1989 | Bowsky | ............. | H01M 50/3425 |
| | | | | 216/54 |
| 2005/0069760 A1* | 3/2005 | Somatomo | .......... | H01M 50/325 |
| | | | | 429/175 |

(Continued)

FOREIGN PATENT DOCUMENTS

| JP | 2005-235531 A | 9/2005 |
| JP | 4121130 B2 | 7/2008 |

(Continued)

OTHER PUBLICATIONS

International Search Report dated Feb. 9, 2021, issued in counterpart International Application No. PCT/JP2020/042744. (2 pages).

*Primary Examiner* — Mark Ruthkosky
(74) *Attorney, Agent, or Firm* — WHDA, LLP

(57) ABSTRACT

A sealed battery includes a battery can with a bottomed cylindrical shape having an opening, an electrode body accommodated in the battery can, and a sealing plate closing the opening of the battery can. The sealing plate has a first main surface facing an outside of the battery can and a second main surface opposite to the first main surface. The first main surface has a first groove therein with an arc shape. The second main surface has a second groove therein with an arc shape disposed to correspond to the first groove. The first groove has a central angle A1 smaller than a central angle A2 of the second groove. The first groove intersects a symmetry axis of the second groove on the second groove when viewed in a normal direction of the first main surface.

15 Claims, 9 Drawing Sheets

300

(56)     References Cited

U.S. PATENT DOCUMENTS

| | | | |
|---|---|---|---|
| 2011/0200854 A1* | 8/2011 | Bak .................. | H01M 50/3425 |
| | | | 429/56 |
| 2012/0114979 A1 | 5/2012 | Kim et al. | |
| 2018/0175333 A1* | 6/2018 | Sodeyama ........ | H01M 50/3425 |
| 2018/0287104 A1 | 10/2018 | Urushihara | |

FOREIGN PATENT DOCUMENTS

| | | | |
|---|---|---|---|
| JP | 2013-502035 A | 1/2013 |
| JP | 2018-166023 A | 10/2018 |
| JP | 2020-47536 A | 3/2020 |

* cited by examiner

SEALED BATTERY

CROSS-REFERENCE TO RELATED APPLICATIONS

This application is a national stage of International Application No. PCT/JP2020/042744, filed Nov. 17, 2020, which claims priority to Japanese Patent Application No. 2019-225354 filed Dec. 13, 2019 both of which are hereby incorporated by reference in their entirety.

TECHNICAL FIELD

The present invention relates to a sealed battery including a battery can, an electrode body accommodated in the battery can, and a sealing plate closing an opening of the battery can.

BACKGROUND ART

Improper use of a sealed battery such as abnormal charge or discharge or dropping into fire may cause gas to be generated inside the sealed battery to increase the internal pressure. As a safety device in such a case, an explosion-proof valve is often provided in a sealed battery. The explosion-proof valve opens to suppress bursting and swelling of the battery. The explosion-proof valve is, for example, a thin part formed by pressing a part of a sealing plate sealing the battery can.

PTL 1 discloses the thin part with an arc shape having a central angle ranging from 90° to 150°.

CITATION LIST

Patent Literature

PTL 1: Japanese Patent Laid-Open Publication No. 2005-235531

SUMMARY

The thin part having a central angle ranging from 90° to 150° formed as in PTL 1 decreases an opening area of the plate when an explosion-proof function is activated. This configuration suppresses an amount of contents coming out of the battery while, on the other hand, increasing an activating pressure of the function. The increase of the activating pressure tends to increase the variation of the activating pressure.

A sealed battery according to an aspect of the present invention includes a battery can with a bottomed cylindrical shape having an opening, an electrode body accommodated in the battery can, and a sealing plate closing the opening of the battery can. The sealing plate has a first main surface facing an outside of the battery can and a second main surface opposite to the first main surface. The first main surface has a first groove therein with an arc shape. The second main surface has a second groove therein with an arc shape disposed to correspond to the first groove. The first groove has a central angle A1 smaller than a central angle A2 of the second groove. The first groove intersects a symmetry axis of the second groove on the second groove when viewed in a normal direction of the first main surface.

According to the present invention, the sealed battery has an explosion-proof valve activated in a low activating pressure with a small variation.

DESCRIPTION OF EMBODIMENT

Figure 1:
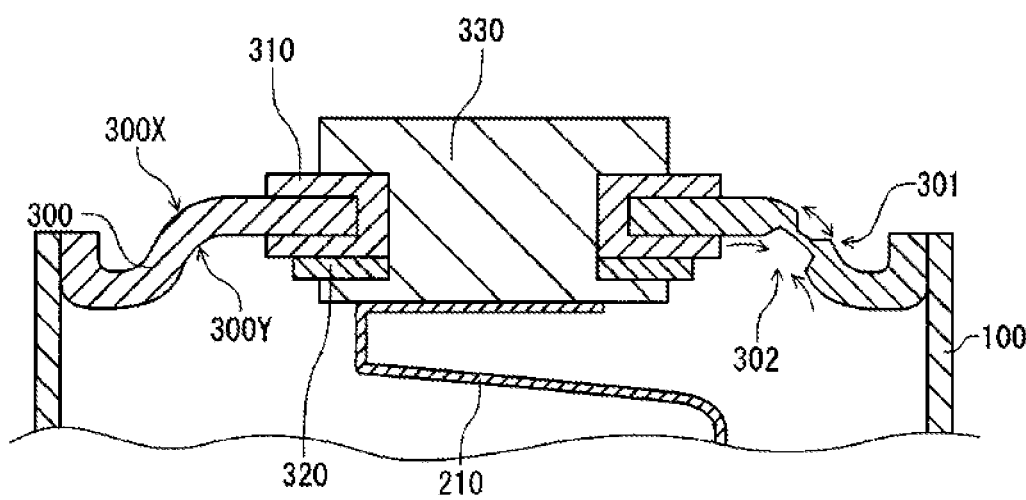
FIG. 1 is a cross sectional view of a main part of a sealed battery when an internal pressure of the sealed battery is increased.

A sealed battery (hereinafter, simply referred to as a battery) according to an exemplary embodiment includes a battery can with a bottomed cylindrical shape having an opening, an electrode body accommodated in the battery can, and a sealing plate closing the opening of the battery can. The sealing plate includes a first main surface facing the outside of the battery can and a second main surface opposite to the first main surface. A first groove having an arc shape is formed on the first main surface. A second groove having an arc shape disposed to correspond to the first groove is formed on the second main surface. A thin part is formed in the sealing plate by the first groove and the second groove. Central angle A1 of the first groove is smaller than central angle A2 of the second groove. The first groove intersects a symmetry axis of the second groove when viewed in the normal direction of the first main surface.

When the internal pressure of the battery increases, a pressure is applied to the sealing plate in a direction in which the sealing plate swells outward. At this moment, a compressive stress is concentrated on the second groove formed in the second main surface facing the inside of the battery can. On the other hand, a tensile stress is generated in the first groove formed in the first main surface facing the outside of the battery can. When these two opposite stresses are applied to the thin part, the thin part breaks, and the internal pressure is released, thus providing the battery with an explosion-proof function. The explosion-proof function suppresses bursting and swelling of the battery.

The second groove facilitates deformation of the sealing plate such that the sealing plate swells outward. At this moment, the sealing plate deforms the most locally on and around the symmetry axis of the second groove. This is because the compressive stress is easy to concentrate on and around the symmetry axis of the second groove. As positioning the first groove so as to intersect the symmetry axis of the second groove results in applying a larger tensile stress to the first groove, the sealing plate quickly break at the thin part. That is, the explosion-proof function is activated at a low activating pressure, and variation in the activating pressure is also suppressed. As central angle A1 of the first groove will be smaller than central angle A2 of the second groove, the tensile stress is easy to concentrate on the first groove. Therefore, the explosion-proof function is activated at a lower pressure, and the variation is further suppressed.

From the viewpoint of preventing scattering of the contents, the activating pressure is preferably less than or equal to 2.5 MPa, and more preferably less than or equal to 2 MPa. According to the present exemplary embodiment, the activating pressure is within this range.

The first groove formed to correspond to the second groove means that at least a part of the first groove overlaps the second groove when viewed in the normal direction of the first main surface. The entire first groove may preferably overlap the second groove.

The first groove intersecting the symmetry axis of the second groove on the second groove means that the first groove overlaps the symmetry axis of the second groove on the second groove when viewed in the normal direction of the first main surface. When the second groove is rotated about the symmetry axis, the second groove overlaps itself. In other words, a rotation axis allowing the second groove to overlap itself before and after a rotation of the second groove about the axis by 180° is the symmetry axis. However, the second groove may be not necessary to completely overlap itself before and after the rotation. For example, when the ends of the second grooves before and after the rotation partially coincide with each other, the rotation axis can be regarded as the symmetry axis. The second groove has a single symmetry axis.

First Groove

The first groove is formed in the first main surface out of the main surfaces of the sealing plate which faces the outside of the battery can. The first groove has an arc shape.

Central angle A1 of the arc shape of the first groove is not limited to a particular value as long as central angle A1 is smaller than central angle A2 of the arc shape of the second groove. The central angle (hereinafter, referred to as a bend angle) affects the internal pressure (activating pressure) activating the explosion-proof function. Bend angle A1 of the first groove is preferably more than or equal to 40°. This configuration enables the sealing plate to be cleaved easily and decreases the activating pressure, accordingly suppressing scattering of the contents. Bend angle A1 of the first groove is more preferably more than or equal to 60°. Bend angle A1 of the first groove is preferably less than or equal to 230°. The tensile stress is easy to concentrate by this configuration and thereby the variation in the activating pressure is decreased. Bend angle A1 of the first groove is more preferably less than or equal to 220°. Bend angle A1 of the first groove is, for example, more than or equal to 60° and less than or equal to 220°.

The bend angle A1 of the first groove is an angle formed by a straight line passing through one outermost end in the circumferential direction of the arc shape of the first groove and extending the radial direction of the sealing plate and a straight line passing through the other outermost end of the arc shape of the first groove and extending the radial direction of the sealing plate. Bend angle A2 of the second groove is defined in the same manner as the bend angle of the first groove.

The first groove also has a single symmetry axis (hereinafter referred to as a first symmetry axis). An acute angle (hereinafter referred to as an intersection angle AC) formed by the first symmetry axis and the symmetry axis of the second groove (hereinafter referred to as a second symmetry axis) is preferably small when viewed from the first main surface. The tensile stress applied to the first groove is easy to concentrate on and around the first symmetry axis. That is, the smaller the intersection angle AC is, the closer the position where the tensile stress concentrates and the position where the compressive stress concentrates is each other. Therefore, the explosion-proof function is easily activated with a low activating pressure without variation. Intersection angle AC formed by the first symmetry axis and the second symmetry axis is preferably less than or equal to 60°. In particular, intersection angle AC is preferably 0°, that is, the first symmetry axis overlaps or agrees with the second symmetry axis.

The depth of the first groove is not limited to a particular value. Depth D1 of the first groove may be determined such that thickness Dm of the thin part is more than or equal to from 5% of thickness D of the sealing plate and less than or equal to 30% of thickness D. Thickness Dm of the thin part within the above-described range easily exhibits the explosion-proof function while maintaining the strength of the sealing plate. Depth D1 may be more than or equal to 20% of thickness D of the sealing plate, or may be more than or equal to 30% of thickness D of the sealing plate. Depth D1 may be less than or equal to 80% of thickness D of the sealing plate, or may be less than or equal to 70% of thickness D of the sealing plate. Thickness Dm of the thin part is a value obtained by subtracting depth D1 and/or depth D2 from thickness D of the sealing plate.

Depth D1 may be determined such that thickness Dm of the thin part is, for example, more than or equal to 0.03 mm and less than or equal to 0.1 mm. In the case that thickness D of the sealing plate is 0.3 mm, depth D1 may be more than or equal to 0.1 mm, or may be less than or equal to 0.2 mm.

The depth of the first groove is the shortest distance from the first main surface to the deepest part of the first groove on each of cross sections of the sealing plate along respective planes extending in radial directions of the sealing plate. Depth D1 is an average value of depths of the first groove measured on three of the cross sections of the first groove. Depth D2 of the second groove is obtained in the same manner as the depth of the first groove.

The width of the first groove is not limited to a particular value. From the viewpoint of workability, width W1 of the first groove may be more than or equal to 0.3 mm, or may be less than or equal to 1.5 mm. The smaller the width W1 is, the more the stress applied to the thin part is easy to concentrate when the internal pressure increases.

The width of the first groove is a length of a line segment overlapping the first groove on a straight line along a radial direction of the sealing plate on the first main surface. Width W1 is an average value of widths of the first groove measured with straight lines drawn along three radial directions of the sealing plate. Width W2 of the second groove is obtained in the same manner.

The position of the first groove on the first main surface is not limited to a particular disposition as long as the first groove corresponds to the second groove. In a cross section cut along a radial direction of the sealing plate, the center of the first groove may agree with the center of the second groove but does not necessarily agree with the center of the second groove. The center of the first groove may be closer to the center of the sealing plate than the center of the second groove. This is because the tensile stress is easy to concentrate on the first symmetry axis. The position of the first groove may be appropriately determined according to, e.g. the radius of the sealing plate. For example, when viewed in the normal direction of the first main surface, at least a part of the first groove may occupy a region from 25% to 70% of a radius from the outer edge of the sealing plate.

The cross-sectional shape of the first groove is not limited to a particular shape. In a cross section of the sealing plate cut along the radial direction of the sealing plate, a bottom of the first groove may have a linear shape, an arc shape, or a dot shape. From the viewpoint of workability, the bottom of the first groove may have a linear shape or an arc shape.

The cross-sectional shape of the first groove is a shape of the first groove in a cross section of the first groove cut along a radial direction of the sealing plate. The bottom of the first groove is the deepest part of the first groove. Specifically, in the cross section of the first groove cut along the radial direction of the sealing plate, when a tangent of the inner wall of the first groove is drawn, a region where an acute angle $\theta$ formed by the tangent and the main surface (first main surface) in which the first groove is formed is less than or equal to 20° is the bottom of the first groove. The same is applied to the cross-sectional shape and the bottom of the second groove.

Second Groove

The second groove is formed in the second main surface out of the main surfaces of the sealing plate which face the inside of the battery can. The second groove has an arc shape and is disposed to correspond to the first groove.

Bend angle A2 of the second groove is not limited to a particular value as long as bend angle A2 is larger than central angle A1 of the first groove. Bend angle A2 of the second groove is preferably more than or equal to 160°. Thereby, as the sealing plate is easy to cleave, the activating pressure is smaller. Bend angle A2 of the second groove is more preferably more than or equal to 180°. Bend angle A2 of the second groove is preferably less than or equal to 310°. This configuration prevents apart of the sealing plate surrounded by a circle formed by extending the second groove of the sealing plate from being completely separated by the internal pressure. Bend angle A2 of the second groove is more preferably less than or equal to 300°. Bend angle A2 of the second groove is, for example, more than or equal to 180° and less than or equal to 300°.

The depth of the second groove is not limited to a particular value. Depth D2 of the second groove may be determined such that thickness Dm of the thin part is more than or equal to 5% of thickness D of the sealing plate and less than or equal to 30% of thickness D of the sealing plate. Depth D2 may be more than or equal to 20% of thickness D of the sealing plate, or may be more than or equal to 30% of thickness D of the sealing plate. Depth D2 may be less than or equal to 80% of thickness D of the sealing plate, or may be less than or equal to 70% of thickness D of the sealing plate.

Depth D2 may be determined such that thickness Dm of the thin part is, for example, more than or equal to 0.03 mm and less than or equal to 0.1 mm. In the case that thickness D of the sealing plate is 0.3 mm, depth D2 may be more than or equal to 0.1 mm, or may be less than or equal to 0.2 mm.

Depth D1 and depth D2 may be same or different from each other. In view that the tensile stress is easier to concentrate, Depth D2 may be larger than depth D1. Depths D1 and D2 may be the same from the viewpoint of workability.

The width of the second groove is not limited to a particular value. From the viewpoint of workability, width W2 of the second groove may be more than or equal to 0.3 mm, or may be less than or equal to 1.5 mm. The smaller width W2 is, the more the stress applied to the thin part is easy to concentrate when the internal pressure increases.

Widths W1 and W2 may be the same or different from each other. Width W1 may be smaller than width W2 to easily exhibit the explosion-proof function. This is because the tensile stress is easier to concentrate on the first groove.

The position of the second groove in the second main surface is not limited to a particular position as long as the second groove corresponds to the first groove. The position of the second groove may be appropriately determined according to, e.g. the radius of the sealing plate. For example, when viewed in the normal direction of the second main surface, at least a part of the second groove may occupy a region from 25% to 70% of a radius of the sealing plate from the outer edge of the sealing plate.

The cross-sectional shape of the second groove is not limited to a particular shape. The second bottom may have a linear shape, or may have an arc shape. The second bottom may have a linear shape so that the compressive stress is easy to concentrate. The second groove may have a flat bottom so that the compressive stress is easy to concentrate.

FIG. 1 is an explanatory view of a sealed battery showing a cross section of a main part of the sealed battery when an internal pressure of the sealed battery is increased. In the following illustrated examples, components having the same functions are denoted by the same reference numerals.

Sealing plate 300 is fixed to around an opening of battery can 100 and closes the opening. Sealing plate 300 has an annular shape having first main surface 300X facing the outside of the battery can and second main surface 300Y opposite to first main surface 300X. Sealing plate 300 has through-hole S (see, e.g. FIG. 2A) in the center thereof. External terminal 330 with a crimped tip is fixed into the through-hole in the center of sealing plate 300 via insulating gasket 310 and washer 320. An end of internal lead wire 210 led out from a positive electrode or a negative electrode constituting an electrode body is connected to external terminal 330. Sealing plate 300, gasket 310, washer 320, and external terminal 330 may be referred to as a sealing body as a whole. The shapes of sealing plate 300 and the sealing body are not limited thereto.

When the internal pressure of the battery increases, a pressure is applied in a direction in which sealing plate 300 swells outward. At this moment, a compressive stress is concentrated on second groove 302 formed in second main surface 300Y of sealing plate 300. On the other hand, a tensile stress is generated in first groove 301 formed in first main surface 300X of sealing plate 300. When these two opposite stresses are applied to the thin part of the sealing plate, the thin part breaks, and the explosion-proof function is activated to reduce the internal pressure.

Next, the sealing plate will be described below with reference to the drawings. The sealing plate according to the present exemplary embodiment is not limited thereto.

Figure 2A:
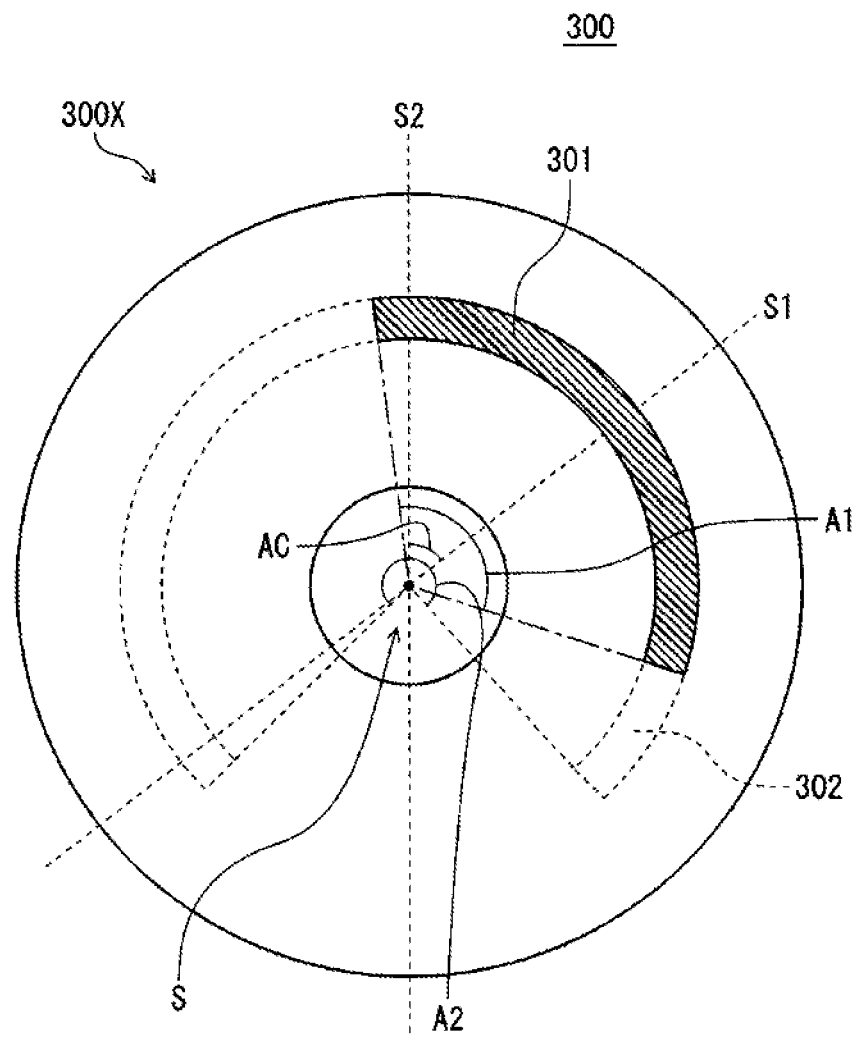
FIG. 2A is a schematic top view of a sealing plate according to an exemplary embodiment of the present invention when viewed from a first main surface.

FIG. 2A is a schematic top view of a sealing plate according to the present exemplary embodiment viewed from the first main surface. In FIG. 2A, the first groove is hatched for convenience.

First groove 301 and second groove 302 with arc shapes are formed in sealing plate 300. First groove 301 is formed in first main surface 300X. Second groove 302 is formed in the second main surface corresponding to first groove 301. The entire first groove 301 substantially overlaps second groove 302.

First groove 301 intersects symmetry axis S2 of second groove 302 on second groove 302 near one end of the first groove. Intersection angle AC formed by first symmetry axis S1 and second symmetry axis S2 is more than 0° and less than or equal to 60°. First bend angle A1 is smaller than second bend angle A2.

Figure 2B:
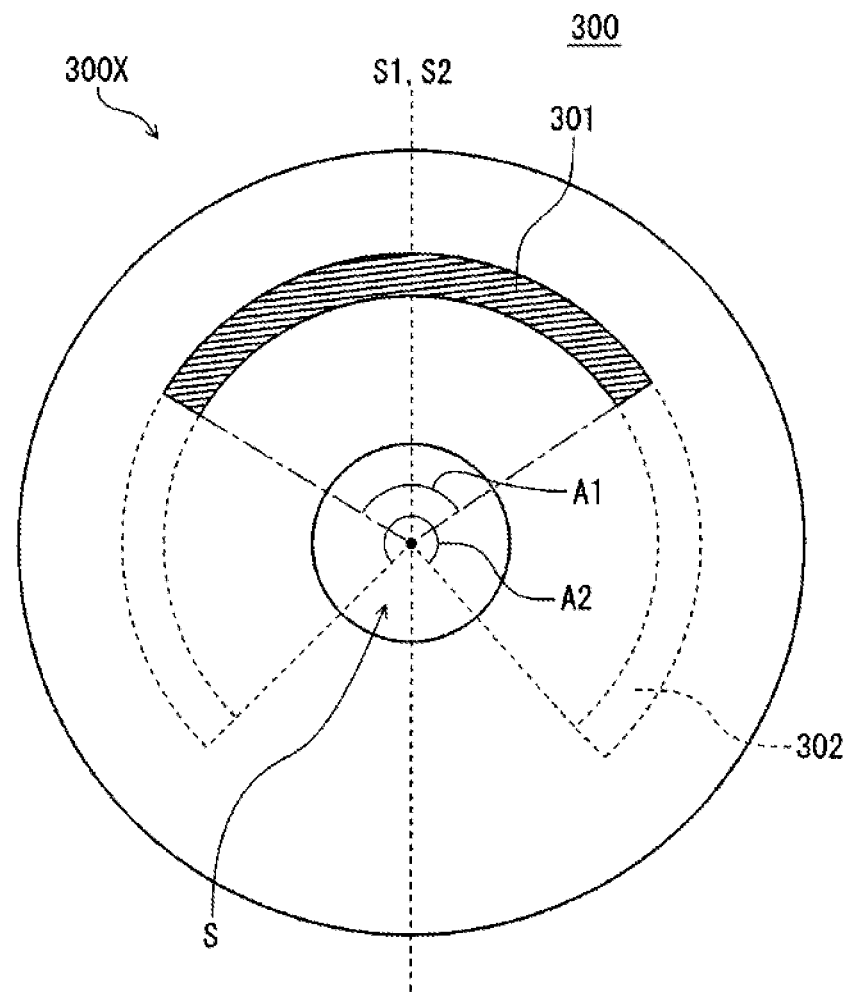
FIG. 2B is a schematic top view of a sealing plate according to another exemplary embodiment of the present invention when viewed from a first main surface.

FIG. 2B is a schematic top view of another sealing plate according to the present exemplary embodiment viewed from the first main surface. Sealing plate 300 is the same as sealing plate 300 shown in FIG. 2A except that symmetry axis S1 of first groove 301 agrees with symmetry axis S2 of second groove 302.

Figure 2C:
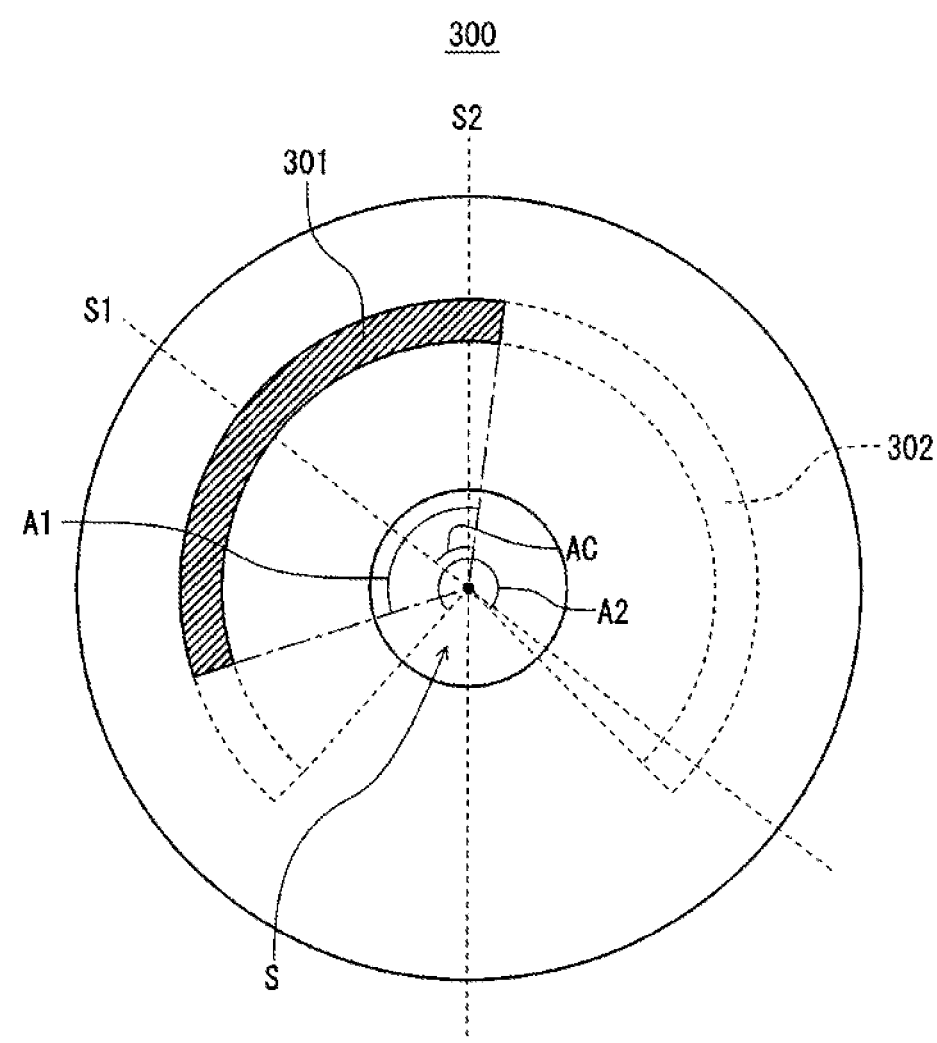
FIG. 2C is a schematic top view of a sealing plate according to still another exemplary embodiment of the present invention when viewed from a first main surface.

FIG. 2C is a schematic top view of still another sealing plate according to the present exemplary embodiment viewed from the first main surface. Sealing plate 300 is the same as sealing plate 300 shown in FIG. 2A except that first groove 301 intersects symmetry axis S2 of second groove 302 on second groove 302 near the other end of first groove 301.

The cross-sectional shapes of the first groove and the second groove will be described below with reference to the drawings. The cross-sectional shape of each groove according to the present exemplary embodiment is not limited thereto.

Figure 3A:
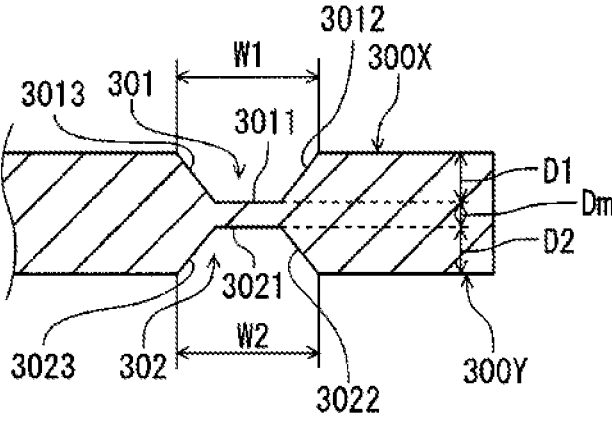
FIG. 3A is an enlarged schematic cross-sectional view of a main part of a sealing plate according to an exemplary embodiment of the present invention.

FIG. 3A is an enlarged schematic cross-sectional view of a main part of a sealing plate according to the present exemplary embodiment.

In the present exemplary embodiment, first groove 301 has first bottom 3011 which is flat and first side surfaces 3012 and 3013 connecting first bottom 3011 to first main surface 300X. Similarly, second groove 302 has second bottom 3021 which is flat and second side surfaces 3022 and 3023 connecting second bottom 3021 to second main surface 300Y. In the present exemplary embodiment, as second bottom 3021 is flat, the compressive stress is easier to concentrate on the second symmetry axis.

When viewed in the normal direction of first main surface 300X of sealing plate 300, the entire first groove 301 overlaps second groove 302. Width W1 of first groove 301 is the same as width W2 of second groove 302. The acute angle formed by first bottom 3011 and first side surface 3012 and the acute angle formed by first bottom 3011 and first side surface 3013 are the same as, and are both more than or equal to 60° and less than or equal to 90°. Thickness D1 is the same as thickness D2 such that thickness Dm of the thin part is more than or equal to 5% of the thickness of the sealing plate and less than or equal to 30% of the thickness of the sealing plate. The positional relationship between the first groove, the first symmetry axis, and the second symmetry axis may be the relationship shown in FIG. 2A, FIG. 2B, or FIG. 2C.

Figure 3B:
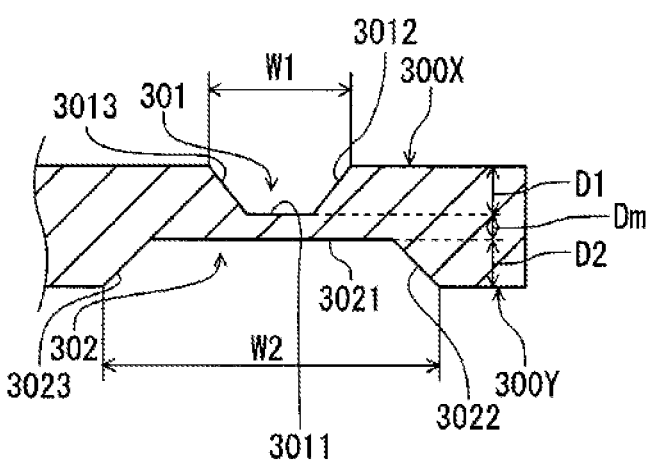
FIG. 3B is an enlarged schematic cross-sectional view of a main part of a sealing plate according to another exemplary embodiment of the present invention.

FIG. 3B is an enlarged schematic cross-sectional view of a main part of another sealing plate according to the present exemplary embodiment.

In the present exemplary embodiment, the sealing plate has the same configuration as the sealing plate shown in FIG. 3A except that width W2 of second groove 302 is larger than width W1 of first groove 301. In the present exemplary embodiment, the second groove with larger width W2 allows the sealing plate to deform with a lower pressure. Furthermore, as the width of the first groove 301 is very small, the tensile stress is easier to concentrate on the first symmetry axis.

Figure 3C:
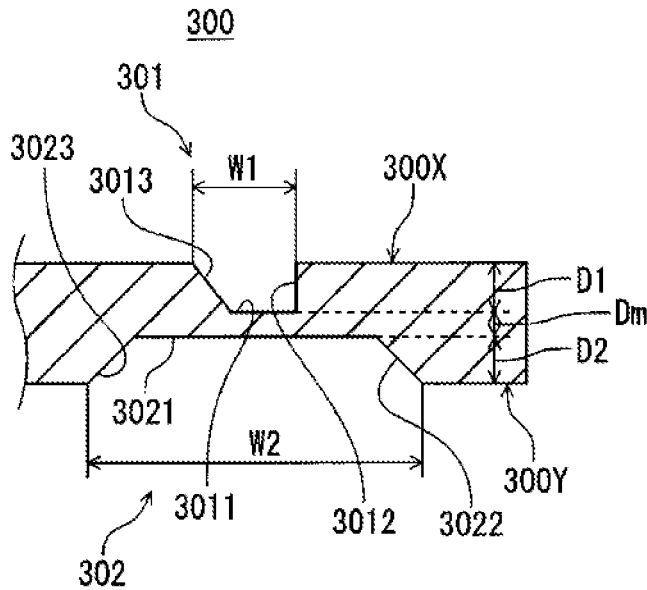
FIG. 3C is an enlarged schematic cross-sectional view of a main part of a sealing plate according to still another exemplary embodiment of the present invention.

FIG. 3C is an enlarged schematic cross-sectional view of a main part of still another sealing plate according to the present exemplary embodiment.

In the present exemplary embodiment, first groove 301 has first bottom 3011 which is flat and first side surfaces 3012 and 3013 connecting first bottom 3011 to first main surface 300X. The angle formed by first bottom 3011 and first side surface 3012 is 90°. The acute angle formed by first bottom 3011 and first side surface 3013 is more than or equal to 60° and less than or equal to 90°. In the present exemplary embodiment, the sealing plate has the same configuration as the sealing plate shown in FIG. 3B except for the inclination angles of the side surfaces. The inclination angles of the two side surfaces being different from each other tend to suppress wear of a die used for press working.

Figure 3D:
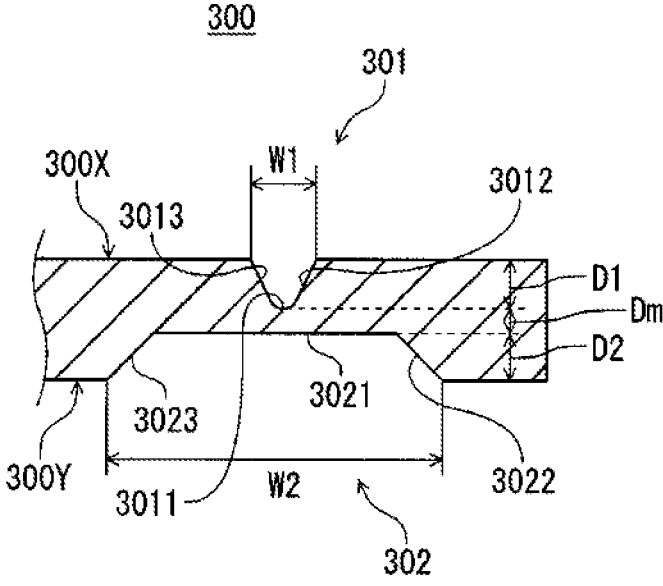
FIG. 3D is an enlarged schematic cross-sectional view of an enlarged main part of a sealing plate according to a further exemplary embodiment of the present invention.

FIG. 3D is an enlarged schematic cross-sectional view of a main part of a further sealing plate according to the present exemplary embodiment.

In the present exemplary embodiment, the sealing plate has the same configuration as the sealing plate shown in FIG. 3B except that first groove 301 has the first bottom 3011 with an arc shape. In this case, the tensile stress is easier to concentrate on first bottom 3011. In addition, this groove is easily formed by press working. Also, a die used for press working hardly deteriorates. The radius of curvature of the arc shape of first bottom 3011 is not particularly limited, and may be, for example, more than or equal to 0.01 mm and less than or equal to 1 mm.

Figure 3E:
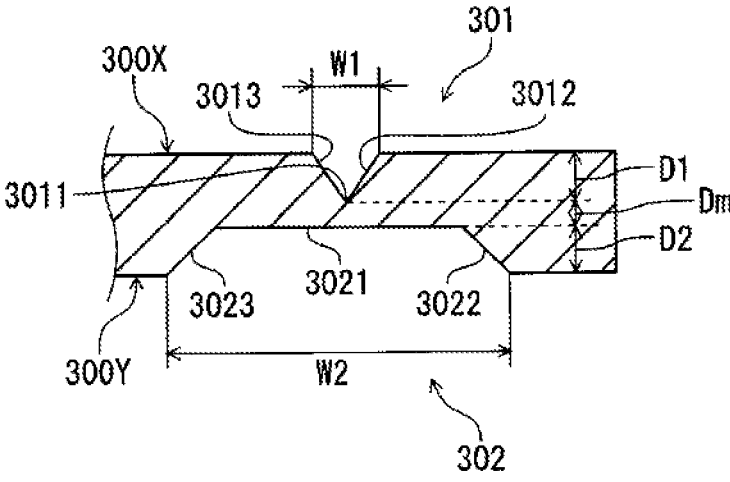
FIG. 3E is an enlarged schematic cross-sectional view of a main part of a sealing plate according to a further exemplary embodiment of the present invention.

FIG. 3E is an enlarged schematic cross-sectional view of a main part of a further sealing plate according to the present exemplary embodiment.

In the present exemplary embodiment, the sealing plate has the same configuration as the sealing plate shown in FIG. 3B except that first bottom 3011 is an intersection line of the two first side surfaces. In this case, the tensile stress is easy to concentrate on the symmetry axis of first groove 301 than the sealing plate shown in FIG. 3D.

Figure 3F:
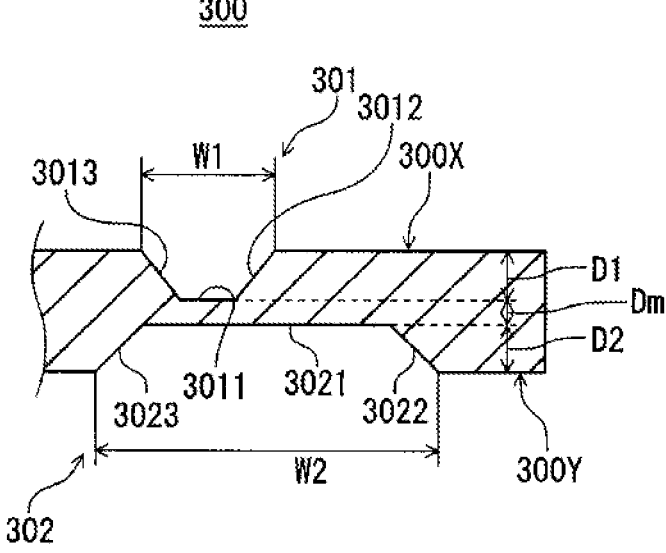
FIG. 3F is an enlarged schematic cross-sectional view of a main part of a sealing plate according to a further exemplary embodiment of the present invention.

FIG. 3F is an enlarged schematic cross-sectional view of a main part of a further sealing plate according to the present exemplary embodiment.

In the present exemplary embodiment, the sealing plate has the same configuration as the sealing plate shown in FIG. 3B except that the center of first bottom 3011 does not agree with the center of second bottom 3021. The center of first bottom 3011 may be closer to the center of sealing plate 300 than the center of second bottom 3021. In this case, the tensile stress is easy to concentrate on the symmetry axis of the first groove.

Figure 3G:
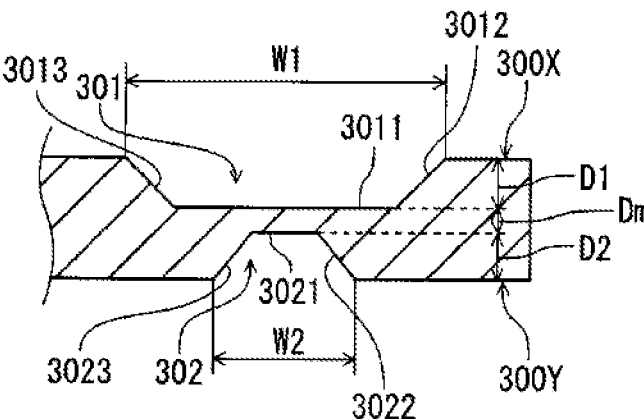
FIG. 3G is an enlarged schematic cross-sectional view of a main part of a sealing plate according to a further exemplary embodiment of the present invention.

FIG. 3G is an enlarged schematic cross-sectional view of a main part of a further sealing plate according to the present exemplary embodiment.

In the present exemplary embodiment, the sealing plate has the same configuration as the sealing plate shown in FIG. 3A except that width W1 of first groove 301 is larger than width W2 of second groove 302. In the present exemplary embodiment, as width W2 of second groove 302 is very small and flat shape, the compressive stress is easier to concentrate on the second symmetry axis.

Figure 4:
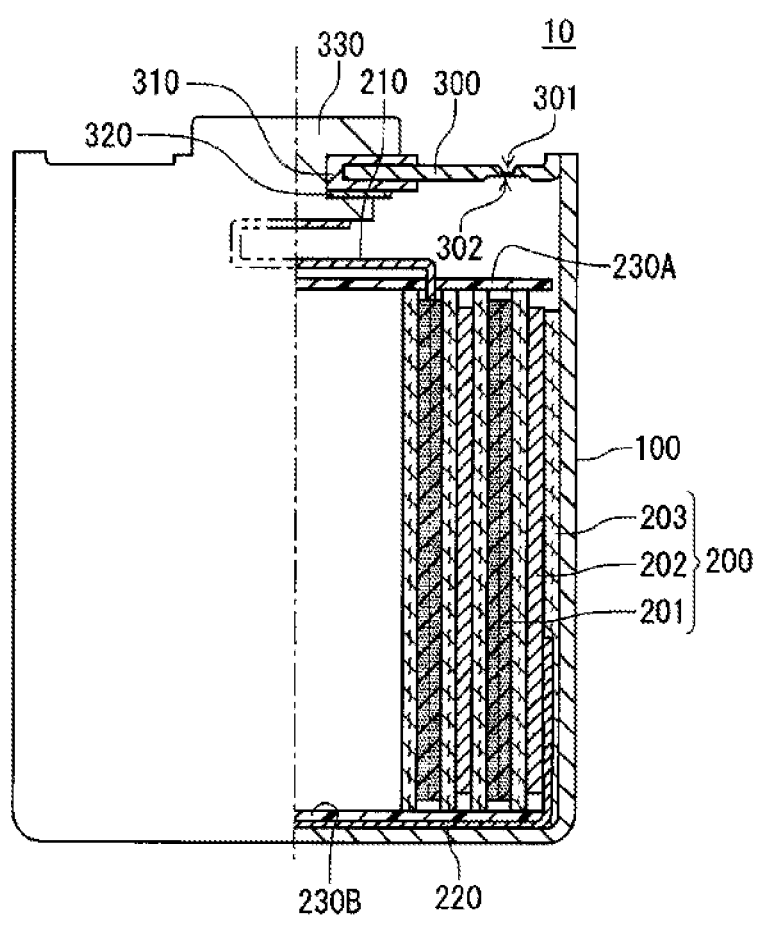
FIG. 4 is a schematic cross-sectional view of a main part of a battery according to an exemplary embodiment of the present invention.

FIG. 4 is a schematic longitudinal cross-sectional view of an example of the sealed battery.

Battery 10 includes battery can 100 having a bottomed cylindrical shape, electrode body 200 having a cylindrical shape accommodated in battery can 100, and sealing plate 300 closing an opening of battery can 100. Sealing plate 300 is fixed to around the opening of battery can 100 by laser welding, for example. Sealing plate 300 may be crimped around the opening of battery can 100.

The materials of battery can 100 and sealing plate 300 are not particularly limited, and examples thereof include iron and/or iron alloy (including stainless steel), aluminum, and an aluminum alloy (alloy containing a small amount of other metals such as manganese and copper, or the like).

A configuration of electrode body 200 will be exemplarily described below with a lithium primary battery as an example.

Electrode body 200 having a cylindrical shape is a wound type, and is configured by spirally winding positive electrode 201 and negative electrode 202 with separator 203 interposed between the electrodes. Internal lead wire 210 is connected to one of positive electrode 201 and negative electrode 202 (positive electrode 201 in the illustrated example). Internal lead wire 210 is connected to external terminal 330 by, e.g. welding. Another internal lead wire 220 is connected to the other one of positive electrode 201 and negative electrode 202 (negative electrode 202 in the illustrated example). Internal lead wire 220 is connected to the inner surface of battery can 100 by, e.g. welding.

Electrode body 200 is accommodated inside battery can 100 together with an electrolyte (not shown). Upper insulating plate 230A and lower insulating plate 230B are disposed in an upper part and a lower part of electrode body 200, respectively, to prevent an internal short circuit.

Positive Electrode

The positive electrode contains a positive electrode active material. Manganese dioxide may be used as the positive electrode active material. The positive electrode includes, for example, a positive electrode current collector and a positive electrode mixture layer attached onto the positive electrode current collector. The positive electrode mixture layer may contain resin material, such as fluororesin as a binder in addition to the positive electrode active material. The positive electrode mixture layer may contain conductive material, such as a carbon material, as conductive agent. The positive electrode current collector is, for example, an expanded metal, a net, or a punched metal made of stainless steel.

Negative Electrode

The negative electrode contains a negative electrode active material. Metal lithium or a lithium alloy may be used as the negative electrode active material. The metal lithium or the lithium alloy is, for example, extruded into a long sheet shape used as the negative electrode. Examples of the lithium alloy include alloy, such as Li—Al, Li—Sn, Li—Ni—Si, or Li—Pb, and a Li—Al alloy is preferable. The content of metal elements other than lithium contained in the lithium alloy is preferably more than or equal to 0.1 mass % and less than or equal to 5 mass % for ensuring a discharge capacity and stabilizing the internal resistance.

Separator

The separator may be preferably made of a microporous film or a nonwoven fabric made of resin. The material (resin) of the separator is preferably polyolefin, polyamide, polyamideimide, or the like.

Electrolyte

The electrolyte may be made of non-aqueous solvent containing lithium salt dissolved therein. The non-aqueous solvent is not particularly limited, and propylene carbonate, ethylene carbonate, 1,2-dimethoxyethane, $\gamma$-butyrolactone, or the like can be used. Examples of the lithium salt include lithium tetrafluoroborate, lithium hexafluorophosphate, lithium trifluoromethanesulfonate, lithium bis(fluorosulfonyl)imide, and lithium bis(trifluoromethylsulfonyl)imide.

Hereinafter, the present invention will be specifically described with reference to Examples and Comparative Examples. However, the present invention is not limited to the following Examples.

Example 1

(1) Production of Sealing Body

A sealing plate (diameter: 17 mm) was produced.

The first and second grooves having cross-sectional shapes shown in FIG. 3A were formed in respective main surfaces of the sealing plate (made of SUS316L) by press working. Bend angle A1 of the first groove is 40°. Width W1 of the first groove is 0.2 mm. Depth D1 is 0.1 mm. The inclinations of the side surfaces of the first groove are both 63°. Bend angle A2 of the second groove is 240°. Width W2 of the second groove is 0.2 mm. Depth D2 is 0.1 mm. The inclinations of the side surfaces of the second groove are both 63°. As shown in FIG. 2B, the symmetry axis of the first groove agrees with the symmetry axis of the second groove.

A through-hole having a diameter of about 3 mm was formed in the center of the sealing plate. An external terminal was fixed into the through-hole via an insulating gasket and a washer, providing the sealing body.

(2) Production of Positive Electrode 3.5 parts by mass of Ketjen black as a conductive agent, 4.5 parts by mass of polytetrafluoroethylene as a binder, and an appropriate amount of pure water were added to 92 parts by mass of electrolytic manganese dioxide as a positive electrode active material, and kneaded to prepare a positive electrode mixture in a wet state.

Next, the positive electrode mixture in a wet state was applied to a positive electrode current collector made of expanded metal made of stainless steel to prepare a positive electrode precursor. After that, the positive electrode precursor was dried, rolled by a roll press, and cut to have a predetermined size, providing a positive electrode with a belt shape.

(3) Production of Negative Electrode

A Li—Al alloy (Al content of 0.3 mass %) with a sheet shape was cut to have a predetermined size to obtain a negative electrode with a belt shape.

(4) Production of Electrode Body

The positive electrode mixture was peeled off from a part of the positive electrode to expose the positive electrode current collector. Then, a positive electrode tab lead made of stainless steel was welded to the exposed part. A negative electrode tab lead made of nickel was welded to a predetermined position of the negative electrode. The positive electrode and the negative electrode were spirally wound with a separator interposed between the electrodes to form a columnar electrode body. A microporous film made of polyethylene was used as the separator.

(5) Preparation of Electrolyte

Lithium trifluoromethanesulfonate as a lithium salt was dissolved at a concentration of 0.5 mol/liter in a non-aqueous solvent obtained by mixing propylene carbonate (PC), ethylene carbonate (EC), and 1,2-dimethoxyethane (DME) at a volume ratio of 2:1:2 to prepare an electrolyte.

(6) Assembly of Cylindrical Battery

The electrode body was inserted into a battery can (made of SUS316L) having a bottomed cylindrical shape with a lower insulating plate with a ring shape disposed at the bottom of the electrode body. The negative electrode tab lead was welded to the inner bottom surface of the battery can. The upper insulating plate with the ring shape was disposed on the upper part of the electrode body. Then, the positive electrode tab lead was welded to the external terminal fixed to the sealing plate. Next, the electrolyte was put in the battery can. Then, the sealing plate was laser-welded to the battery can around the opening of the battery can. In this manner, 10 sealed cylindrical lithium batteries having the structure shown in FIG. 4 were produced. Separately, 10 sealed batteries for evaluation were produced for evaluation of activating pressure in the same manner except that the electrode body and the electrolyte were not accommodated.

Evaluation (I) Activating Pressure

A hole was made in the side surface of the battery can of the battery for evaluation, water was supplied from the hole, and the pressure inside the battery was increased by water pressure to activate the explosion-proof function.

An average value (n=10), a standard deviation ($\sigma$), and the average value +3$\sigma$ of the activating pressure were calculated. The results are shown in Table 1.

The average value ±3$\sigma$ is a numerical value in which more than or equal to 99.7% of the object falls within the range of the average value 36. In other words, the case where the activating pressure exceeds the average value +3$\sigma$ has a probability of less than 0.3%.

(II) Scattering Amount of Contents

The side surface of the battery can of the cylindrical lithium battery was heated with a gas burner, and the explosion-proof function was activated by a test simulating a throwing test in fire.

After the explosion-proof function was activated, the mass ratio (scattering ratio) of the contents scattered outside the battery to the contents (the electrode body and/or the electrolyte) that had been accommodated in the battery was calculated and evaluated according to the following indices. The results are shown in Table 1.

A: The scattering ratio is less than 10 mass %.

B: The scattering ratio is 10 mass % or more and less than 40% mass.

C: The scattering ratio is 40 mass % or more and less than 70 mass %.

D: The scattering ratio is 70 mass % or more.

Example 2

A sealing plate was produced in the same manner as in Example 1 except that bend angle A1 of the first groove was 50° in (1) Production of Sealing Body. With the obtained sealing plate, 10 cylindrical lithium batteries and 10 batteries for evaluation were produced and evaluated in the same manner as in Example 1. The results are shown in Table 1.

Example 3

A sealing plate was produced in the same manner as in Example 1 except that bend angle A1 of the first groove was 60° in (1) Production of Sealing Body. With the obtained sealing plate, 10 cylindrical lithium batteries and 10 batteries for evaluation were produced and evaluated in the same manner as in Example 1. The results are shown in Table 1.

Example 4

A sealing plate was produced in the same manner as in Example 1 except that bend angle A1 of the first groove was set to 70° in (1) Production of sealing body. With the obtained sealing plate, 10 cylindrical lithium batteries and 10 batteries for evaluation were produced and evaluated in the same manner as in Example 1. The results are shown in Table 1.

Example 5

A sealing plate was produced in the same manner as in Example 1 except that bend angle A1 of the first groove was 90° in (1) Production of Sealing Body. With the obtained sealing plate, 10 cylindrical lithium batteries and 10 batteries for evaluation were produced and evaluated in the same manner as in Example 1. The results are shown in Table 1.

Example 6

A sealing plate was produced in the same manner as in Example 1 except that bend angle A1 of the first groove was 100° in (1) Production of Sealing Body. With the obtained sealing plate, 10 cylindrical lithium batteries and 10 batteries for evaluation were produced and evaluated in the same manner as in Example 1. The results are shown in Table 1.

Example 7

A sealing plate was produced in the same manner as in Example 1 except that bend angle A1 of the first groove was 200° in (1) Production of Sealing Body. With the obtained sealing plate, 10 cylindrical lithium batteries and 10 batteries for evaluation were produced and evaluated in the same manner as in Example 1. The results are shown in Table 1.

Example 8

A sealing plate was produced in the same manner as in Example 1 except that bend angle A1 of the first groove was 210° in (1) Production of Sealing Body. With the obtained sealing plate, 10 cylindrical lithium batteries and 10 batteries for evaluation were produced and evaluated in the same manner as in Example 1. The results are shown in Table 1.

Example 9

A sealing plate was produced in the same manner as in Example 1 except that bend angle A1 of the first groove was 220° in (1) Production of Sealing Body. With the obtained sealing plate, 10 cylindrical lithium batteries and 10 batteries for evaluation were produced and evaluated in the same manner as in Example 1. The results are shown in Table 1.

Example 10

A sealing plate was produced in the same manner as in Example 1 except that bend angle A1 of the first groove was 230° in (1) Production of Sealing Body. With the obtained sealing plate, 10 cylindrical lithium batteries and 10 batteries for evaluation were produced and evaluated in the same manner as in Example 1. The results are shown in Table 1.

Comparative Example 1

A sealing plate was produced in the same manner as in Example 1 except that bend angle A1 of the first groove was 240° in (1) Production of Sealing body. With the obtained sealing plate, 10 cylindrical lithium batteries and 10 batteries for evaluation were produced and evaluated in the same manner as in Example 1. The results are shown in Table 1.

TABLE 1

| | Bend Angle (°) | | Inter-section Angle AC | Activating Pressure (MPa) | | | Coming out of con- |
|---|---|---|---|---|---|---|---|
| | | | | Aver-age | Standard deviation | Average value + | |
| | A1 | A2 | (°) | value | (σ) | 3σ | tents |
| Example 1 | 40 | 240 | 0 | 1.88 | 0.18 | 2.42 | A |
| Example 2 | 50 | 240 | 0 | 1.76 | 0.17 | 2.27 | A |
| Example 3 | 60 | 240 | 0 | 1.57 | 0.13 | 1.96 | A |
| Example 4 | 70 | 240 | 0 | 1.56 | 0.12 | 1.92 | A |
| Example 5 | 90 | 240 | 0 | 1.50 | 0.11 | 1.83 | A |
| Example 6 | 100 | 240 | 0 | 1.55 | 0.12 | 1.91 | A |
| Example 7 | 200 | 240 | 0 | 1.65 | 0.11 | 1.98 | A |
| Example 8 | 210 | 240 | 0 | 1.52 | 0.12 | 1.88 | A |
| Example 9 | 220 | 240 | 0 | 1.54 | 0.15 | 1.99 | A |
| Example 10 | 230 | 240 | 0 | 1.54 | 0.19 | 2.11 | A |
| Com-parative Example 1 | 240 | 240 | 0 | 2.25 | 0.20 | 2.85 | C |

In Examples 1 to 10, the average value of the activating pressure is less than or equal to 1.88 MPa, the standard deviation is less than or equal to 0.19, and the average value +3σ is less than or equal to 2.42 MPa. In the case that the standard deviation is less than or equal to 0.2, preferably less than or equal to 0.15, and the average value +3σ is less than or equal to 2.5 MPa, the activating pressure is low and the variation thereof is small. In Examples 1 to 10, the contents scattered very little.

On the other hand, in Comparative Example 1, both the average value and the average value +3σ of the activating pressure are high. Furthermore, because bend angle A1 of the first groove is excessively large, scattering of the contents was observed.

Example 11

A sealing plate was produced in the same manner as in Example 5 except that the first groove was disposed such that intersection angle AC was 30° in (1) Production of Sealing Body. With the obtained sealing plate, 10 cylindrical lithium batteries and 10 batteries for evaluation were produced and evaluated in the same manner as in Example 1. The results are shown in Table 2.

Example 12

A sealing plate was produced in the same manner as in Example 5 except that the first groove was disposed such that intersection angle AC was 40° in (1) Production of Sealing Body. With the obtained sealing plate, 10 cylindrical lithium batteries and 10 batteries for evaluation were produced and evaluated in the same manner as in Example 1. The results are shown in Table 2.

Comparative Example 2

A sealing plate was produced in the same manner as in Example 5 except that the first groove was disposed such that intersection angle AC was 50° in (1) Production of Sealing Body. The first groove does not intersect the symmetry axis of the second groove. With the obtained sealing plate, 10 cylindrical lithium batteries and 10 batteries for evaluation were produced and evaluated in the same manner as in Example 1. The results are shown in Table 2.

TABLE 2

| | Bend Angle (°) | | Inter-section Angle | Activating Pressure (MPa) | | | Coming out of con- |
|---|---|---|---|---|---|---|---|
| | | | | Aver-age | Standard Deviation | Aver-age Value | |
| | A1 | A2 | AC (°) | Value | (σ) | + 3σ | tents |
| Example 5 | 90 | 240 | 0 | 1.50 | 0.11 | 1.83 | A |
| Example 11 | 90 | 240 | 30 | 1.86 | 0.15 | 2.31 | A |
| Example 12 | 90 | 240 | 40 | 2.01 | 0.16 | 2.49 | A |
| Comparative Example 2 | 90 | 240 | 50* | 2.83 | 0.18 | 3.37 | B |

In Examples 11 and 12, intersection angle AC is larger than that in Example 5, but the first groove intersects the symmetry axis of the second groove. Therefore, the average value of the activating pressure is less than or equal to 2.01 MPa, the standard deviation is less than or equal to 0.16, and the average value +3σ is less than or equal to 2.49 MPa. On the other hand, in Comparative Example 2 in which the first groove does not intersect the symmetry axis of the second groove, both the average value and the average value +3σ of the activating pressure are very high. Furthermore, in Comparative Example 2, because the activating pressure was high, the contents scattered.

Example 13

A sealing plate was produced in the same manner as in Example 1 except that bend angle A1 of the first groove was set to 150° and bend angle A2 of the second groove was set to 160° in (1) Production of sealing body. With the obtained sealing plate, 10 cylindrical lithium batteries and 10 batteries for evaluation were produced and evaluated in the same manner as in Example 1. The results are shown in Table 3.

Example 14

A sealing plate was produced in the same manner as in Example 13 except that bend angle A2 of the second groove was 170° in (1) Production of Sealing Body. With the obtained sealing plate, 10 cylindrical lithium batteries and 10 batteries for evaluation were produced and evaluated in the same manner as in Example 1. The results are shown in Table 3.

Example 15

A sealing plate was produced in the same manner as in Example 13 except that bend angle A2 of the second groove was 180° in (1) Production of Sealing Body. With the obtained sealing plate, 10 cylindrical lithium batteries and 10 batteries for evaluation were produced and evaluated in the same manner as in Example 1. The results are shown in Table 3.

Example 16

A sealing plate was produced in the same manner as in Example 13 except that bend angle A2 of the second groove was 190° in (1) Production of Sealing Body. With the obtained sealing plate, 10 cylindrical lithium batteries and 10 batteries for evaluation were produced and evaluated in the same manner as in Example 1. The results are shown in Table 3.

Example 17

A sealing plate was produced in the same manner as in Example 13 except that bend angle A2 of the second groove was 280° in (1) Production of sealing body. With the obtained sealing plate, 10 cylindrical lithium batteries and 10 batteries for evaluation were produced and evaluated in the same manner as in Example 1. The results are shown in Table 3.

Example 18

A sealing plate was produced in the same manner as in Example 13 except that bend angle A2 of the second groove was 290° in (1) Production of Sealing Body. With the obtained sealing plate, 10 cylindrical lithium batteries and 10 batteries for evaluation were produced and evaluated in the same manner as in Example 1. The results are shown in Table 3.

Example 19

A sealing plate was produced in the same manner as in Example 13 except that bend angle A2 of the second groove was 300° in (1) Production of Sealing Body. With the obtained sealing plate, 10 cylindrical lithium batteries and 10 batteries for evaluation were produced and evaluated in the same manner as in Example 1. The results are shown in Table 3.

Example 20

A sealing plate was produced in the same manner as in Example 13 except that bend angle A2 of the second groove was set to 310° in (1) Production of sealing body. With the obtained sealing plate, 10 cylindrical lithium batteries and 10 batteries for evaluation were produced and evaluated in the same manner as in Example 1. The results are shown in Table 3.

Comparative Example 3

A sealing plate was produced in the same manner as in Example 1 except that bend angle A1 of the first groove and bend angle A2 of the second groove were both 150° in (1) Production of Sealing Body. With the obtained sealing plate, 10 cylindrical lithium batteries and 10 batteries for evaluation were produced and evaluated in the same manner as in Example 1. The results are shown in Table 3.

TABLE 3

| | Bend Angle (°) | | Inter-section Angle | Activating Pressure (MPa) | | | |
|---|---|---|---|---|---|---|---|
| | | | | Average | Standard Deviation | Average Value + | Coming out of |
| | A1 | A2 | AC (°) | Value | (σ) | 3σ | contents |
| Comparative Example 3 | 150 | 150 | 0 | 2.57 | 0.20 | 3.17 | B |
| Example 13 | 150 | 160 | 0 | 1.93 | 0.18 | 2.47 | A |
| Example 14 | 150 | 170 | 0 | 1.72 | 0.15 | 2.17 | A |

TABLE 3-continued

| | Bend Angle (°) | | Inter-section Angle | Activating Pressure (MPa) | | | |
|---|---|---|---|---|---|---|---|
| | | | | Aver-age | Standard Deviation | Average Value + | Coming out of |
| | A1 | A2 | AC (°) | Value | (σ) | 3σ | contents |
| Example 15 | 150 | 180 | 0 | 1.57 | 0.14 | 1.99 | A |
| Example 16 | 150 | 190 | 0 | 1.45 | 0.13 | 1.8 | A |
| Example 17 | 150 | 280 | 0 | 1.48 | 0.14 | 1.90 | A |
| Example 18 | 150 | 290 | 0 | 1.52 | 0.15 | 1.97 | A |
| Example 19 | 150 | 300 | 0 | 1.55 | 0.14 | 1.97 | A |
| Example 20 | 150 | 310 | 0 | 1.68 | 0.16 | 2.16 | A |

In any of Examples 13 to 20, the average value of the activating pressure is less than or equal to 1.93 MPa, the standard deviation is less than or equal to 0.18, and the average value +3σ is less than or equal to 2.47 MPa. That is, these batteries have low activating pressures and small variations thereof. In particular, in Examples 17 to 20, although bend angle A2 of the second groove is sufficiently larger than bend angle A1 of the first groove, the contents scattered very little from any of the batteries.

Example 21

A sealing plate was produced in the same manner as in Example 19 except that the first groove was disposed such that intersection angle AC was 50° in (1) Production of Sealing Body. With the obtained sealing plate, 10 cylindrical lithium batteries and 10 batteries for evaluation were produced and evaluated in the same manner as in Example 1. The results are shown in Table 4.

Example 22

A sealing plate was produced in the same manner as in Example 19 except that the first groove was disposed such that intersection angle AC was 60° in (1) Production of Sealing Body. With the obtained sealing plate, 10 cylindrical lithium batteries and 10 batteries for evaluation were produced and evaluated in the same manner as in Example 1. The results are shown in Table 4.

Example 23

A sealing plate was produced in the same manner as in Example 19 except that the first groove was disposed such that intersection angle AC was 70° in (1) Production of Sealing Body. With the obtained sealing plate, 10 cylindrical lithium batteries and 10 batteries for evaluation were produced and evaluated in the same manner as in Example 1. The results are shown in Table 4.

TABLE 4

| | Bend Angle (°) | | Inter-section Angle AC | Activating Pressure (MPa) | | | |
|---|---|---|---|---|---|---|---|
| | | | | Aver-age | Standard Deviation | Average Value + | Coming out of |
| | A1 | A2 | (°) | Value | (σ) | 3σ | contents |
| Example 19 | 150 | 300 | 0 | 1.55 | 0.14 | 1.97 | A |
| Example 21 | 150 | 300 | 50 | 1.71 | 0.14 | 2.13 | A |
| Example 22 | 150 | 300 | 60 | 1.73 | 0.16 | 2.21 | A |
| Example 23 | 150 | 300 | 70 | 2.05 | 0.2 | 2.65 | A |

In Examples 21 to 23, intersection angle AC is larger than that in Example 19, but the first groove intersects the symmetry axis of the second groove. Therefore, the average value of the activating pressure is less than or equal to 2.05 MPa, the standard deviation is less than or equal to 0.2, and the average value +3σ is less than or equal to 2.65 MPa. The contents scattered very little from any of the batteries.

INDUSTRIAL APPLICABILITY

A sealed battery according to the present invention exhibits a stable explosion-proof function, and is suitable as a power source for various electronic devices.

REFERENCE MARKS IN THE DRAWINGS

10 battery
100 battery can
200 electrode body
201 positive electrode
202 negative electrode
203 separator
210, 220 internal lead wire
230A upper insulating plate
230B lower insulating plate
300 sealing plate
300X first main surface
300Y second main surface
301 first groove
3011 first bottom
3012, 3013 first side surface
302 second groove
3021 second bottom
3022, 3023 second side surface
310 gasket
320 washer
330 external terminal

The invention claimed is:

1. A sealed battery comprising:
a battery can with a bottomed cylindrical shape having an opening;
an electrode body accommodated in the battery can; and
a sealing plate closing the opening of the battery can, wherein
the sealing plate has a first main surface facing an outside of the battery can and a second main surface opposite to the first main surface and facing an inside of the battery can,
the first main surface has a first groove therein, the first groove having an arc shape,
the second main surface has a second groove therein, the second groove having an arc shape,
the first groove has a central angle A1 smaller than a central angle A2 of the second groove,
the first groove is symmetrical about a first symmetry axis, and the second groove is symmetrical about a second symmetry axis,
the first groove intersects the second symmetry axis of the second groove when viewed in a normal direction of the first main surface,
at least a part of the first groove overlaps the second groove when viewed in the normal direction of the first main surface, and
the central angle A1 of the first groove is more than or equal to 60° and less than or equal to 220°.

2. The sealed battery according to claim 1, wherein the central angle A2 of the second groove is more than or equal to 180° and less than or equal to 300°.

3. The sealed battery according to claim 1, wherein an acute angle AC formed by the first symmetry axis of the first groove and the second symmetry axis of the second groove is less than or equal to 60° when viewed in the normal direction of the first main surface.

4. The sealed battery according to claim 1, wherein the first symmetry axis of the first groove agrees with the second symmetry axis of the second groove when viewed in the normal direction of the first main surface.

5. The sealed battery according to claim 1, wherein the central angle A1 is defined by a pair of circumferential ends of the arc shape of the first groove, and each of said pair of circumferential ends is immediately adjacent to the first main surface.

6. The sealed battery according to claim 1, wherein the sealing plate has a thin part thereof defined between respective bottom surfaces of the first groove and the second groove.

7. The sealed battery according to claim 1, wherein the sealing plate includes a monolithic plate defining the first main surface and the second main surface.

8. The sealed battery according to claim 1, wherein an acute angle formed by the first symmetry axis of the first groove and the second symmetry axis of the second groove is more than 0° when viewed in the normal direction of the first main surface.

9. A sealed battery comprising:
a battery can with a bottomed cylindrical shape having an opening;
an electrode body accommodated in the battery can; and
a sealing plate closing the opening of the battery can, wherein
the sealing plate has a first main surface facing an outside of the battery can and a second main surface opposite to the first main surface and facing an inside of the battery can,
the first main surface has a first groove therein, the first groove having an arc shape,
the second main surface has a second groove therein, the second groove having an arc shape,
the first groove has a central angle A1 smaller than a central angle A2 of the second groove,
the first groove is symmetrical about a first symmetry axis, and the second groove is symmetrical about a second symmetry axis,
the first groove intersects the second symmetry axis of the second groove when viewed in a normal direction of the first main surface,
at least a part of the first groove overlaps the second groove when viewed in the normal direction of the first main surface, and
the central angle A2 of the second groove is more than or equal to 180° and less than or equal to 300°.

10. The sealed battery according to claim 9, wherein an acute angle AC formed by the first symmetry axis of the first groove and the second symmetry axis of the second groove is less than or equal to 60° when viewed in the normal direction of the first main surface.

11. The sealed battery according to claim 9, wherein the first symmetry axis of the first groove agrees with the second symmetry axis of the second groove when viewed in the normal direction of the first main surface.

12. The sealed battery according to claim 9, wherein the central angle A1 is defined by a pair of circumferential ends of the arc shape of the first groove, and each of said pair of circumferential ends is immediately adjacent to the first main surface.

13. The sealed battery according to claim 9, wherein the sealing plate has a thin part thereof defined between respective bottom surfaces of the first groove and the second groove.

14. The sealed battery according to claim 9, wherein the sealing plate includes a monolithic plate defining the first main surface and the second main surface.

15. The sealed battery according to claim 9, wherein an acute angle formed by the first symmetry axis of the first groove and the second symmetry axis of the second groove is more than 0° when viewed in the normal direction of the first main surface.

\* \* \* \* \*